United States Patent [19]
Barnholt

[11] Patent Number: 5,655,418
[45] Date of Patent: Aug. 12, 1997

[54] AXLE CARRIER TRUNNION WITH STEPPED BORE

[75] Inventor: Mark C. Barnholt, Fort Wayne, Ind.

[73] Assignee: Dana Corporation, Toledo, Ohio

[21] Appl. No.: 373,395

[22] Filed: Jan. 17, 1995

[51] Int. Cl.⁶ .............................. F16H 57/02; F16H 48/00
[52] U.S. Cl. ........................... 74/607; 475/230; 403/375
[58] Field of Search .................. 74/607, 567; 475/230; 403/375, 345, 300; 285/382; 29/525, 897.2

[56] References Cited

U.S. PATENT DOCUMENTS

| | | |
|---|---|---|
| 1,209,134 | 12/1916 | Dodge . |
| 1,403,500 | 1/1922 | Huff . |
| 2,569,452 | 10/1951 | Buckendale ........................ 74/602 |
| 3,303,721 | 2/1967 | Puidokas ............................ 74/607 |
| 3,308,682 | 3/1967 | Puidokas ............................ 74/607 |
| 3,476,413 | 11/1969 | Coberly et al. ................ 403/300 X |
| 3,689,112 | 9/1972 | Slator et al. ................... 285/382 X |
| 3,726,154 | 4/1973 | Diessner ............................ 74/607 |
| 3,793,704 | 2/1974 | Antonevich .................... 29/525 X |
| 3,905,089 | 9/1975 | Osenbaugh et al. ......... 74/607 X |
| 4,227,427 | 10/1980 | Dick ................................... 74/467 |
| 4,419,804 | 12/1983 | Axthammer ................... 29/525 X |
| 4,693,138 | 9/1987 | Hughes et al. .................. 74/567 |
| 4,769,897 | 9/1988 | Moseman ..................... 285/382 X |
| 4,787,267 | 11/1988 | Kessler et al. ................ 74/607 X |
| 4,876,916 | 10/1989 | Maier ................................ 74/567 |
| 5,165,304 | 11/1992 | Swars ................................ 74/567 |
| 5,280,675 | 1/1994 | Orsini, Jr. ...................... 74/567 X |
| 5,398,981 | 3/1995 | Barton ............................. 285/382 |
| 5,435,207 | 7/1995 | Orsini, Jr. ........................ 74/567 |

FOREIGN PATENT DOCUMENTS

| | | | |
|---|---|---|---|
| 2 297 344 | 8/1976 | France ............................ 403/300 |
| 35 46 045 | 6/1987 | Germany ........................ 29/525 |
| 3 704 092 | 5/1988 | Germany ........................ 74/567 |
| 3 275 910 | 12/1991 | Japan ............................... 74/567 |

Primary Examiner—Charles A. Marmor
Assistant Examiner—Mary Ann Battista
Attorney, Agent, or Firm—Oldham & Oldham Co., L.P.A.

[57] ABSTRACT

A structure for supporting a generally cylindrical hollow tube comprising at least one trunnion which is adapted for receiving a generally cylindrical hollow tube. The trunnion includes a radially stepped bore formed therein and extending between first and second ends of the trunnion. The stepped bore includes a first generally cylindrical portion extending axially from the first end toward the second end. The first portion of the bore has a diameter which is less than an outside diameter of the tube, so that the tube engages the trunnion in an interference fit throughout the first portion of the bore. The stepped bore further includes a second axially extending, generally cylindrical portion having a diameter which is greater than the diameter of the first portion of the bore and greater than the outside diameter of the tube, so that the tube does not engage the trunnion in an interference fit in the area corresponding to the second portion of the bore. The trunnion further includes at least one radially extending hole formed therethrough and intersecting the second portion of the stepped bore.

11 Claims, 3 Drawing Sheets

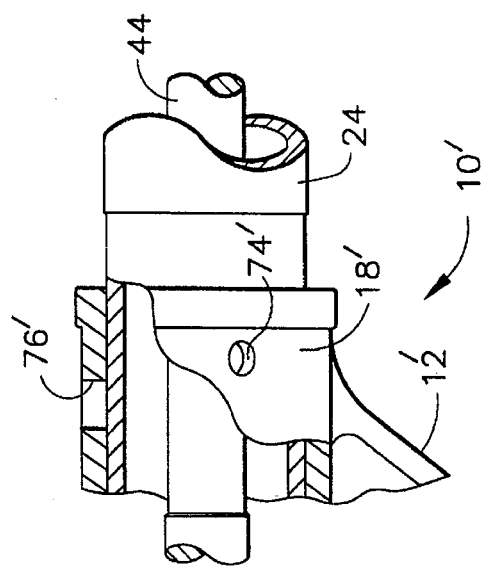
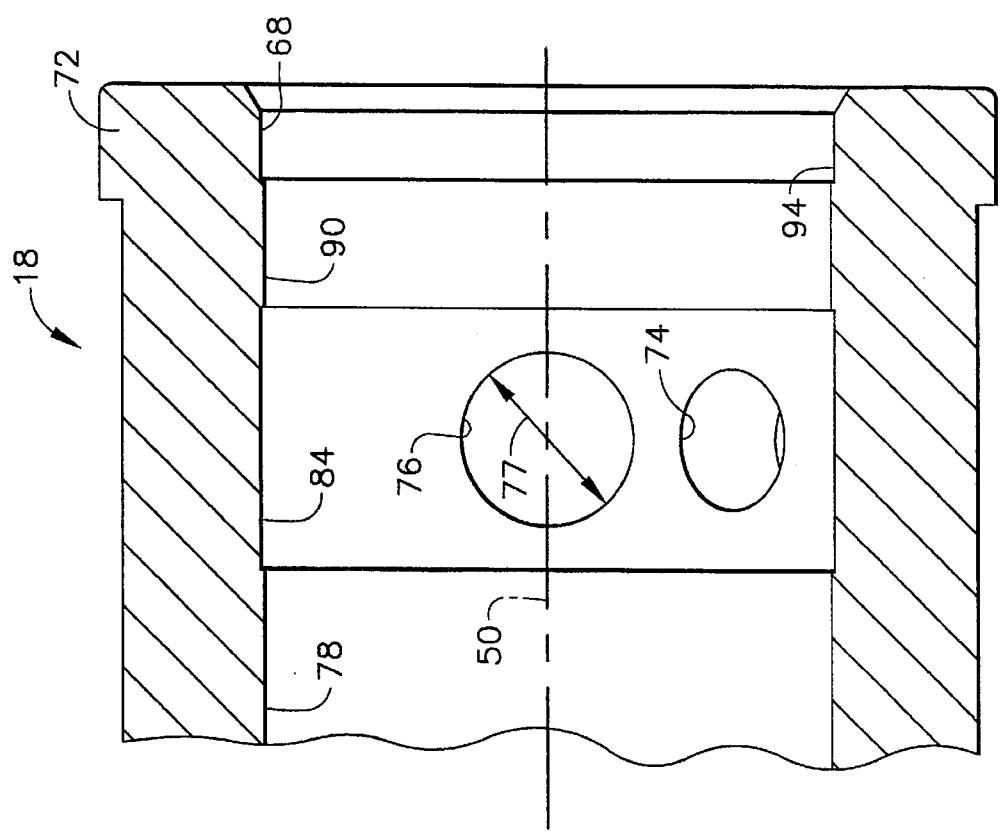

AXLE CARRIER TRUNNION WITH STEPPED BORE

BACKGROUND OF THE INVENTION

1. Field of the Invention

The present invention relates generally to an axle carrier for use in an axle assembly and, more particularly, to an axle carrier trunnion having a stepped bore.

2. Related Art

Carrier-type axle housing assemblies, commonly referred to as a Salisbury designs, have been utilized in the automotive industry for some time. With this type of axle housing, an axle tube is pressed into each one of a pair of carrier trunnions, with each tube being plug welded to the carrier through radially extending holes formed in the corresponding carrier trunnion. An additional hole is formed in each trunnion for purposes of spreading the carrier in order to properly preload the differential bearing during installation of the differential which is housed within the carrier. The carrier trunnions require strength to withstand, or carry stress from two primary sources: the hoop stress resulting from the interference fit between the axle tube and the trunnion; and the bending stress resulting from the suspension loads of the vehicle, caused by forces applied at the spring attachments and wheels. More recently, cast aluminum or other non-ferrous alloys have been utilized to manufacture the axle carriers in place of cast iron in response to customer demands for weight reduction, and the associated increase in fuel efficiency of the vehicle. The puddle weld holes, spreader holes, and the outboard ends of the trunnions are locations of stress concentration, and accordingly, have been known to comprise fracture origin cites during overload testing of aluminum axle carriers. Accordingly, at the time of the present invention, automotive design engineers continue to search for new and improved axle carriers having comparable strength but reduced weight as compared to prior, ferrous material axle carriers.

SUMMARY

Accordingly, the present invention is directed to a structure for supporting a generally cylindrical hollow tube comprising at least one trunnion which is adapted to receive a generally cylindrical hollow tube. The trunnion includes a radially stepped bore formed therein, a first end, and a second end, wherein the stepped bore extends between the first and second ends. The radially stepped bore includes a first axially extending, generally cylindrical portion extending from the first end of the trunnion toward second end. The diameter of the first cylindrical portion of the stepped bore is less than the outside diameter of the tube so that the tube engages the trunnion in an interference fit throughout the first portion of the stepped bore. The radially stepped bore further includes a second axially extending, generally cylindrical portion having a diameter which is greater than the diameter of the first portion and greater than the outside diameter of the tube. The trunnion further includes at least one radially extending hole formed therethrough and intersecting the second portion of the stepped bore.

A main advantage of the present invention is the elimination of an interference fit between the tube and trunnion in the area of the stress riser created by the access hole extending through the trunnion, so as to enhance the impact strength of the trunnion.

BRIEF DESCRIPTION OF THE DRAWINGS

The aforementioned advantage, as well as the structural features and functions, and other advantages of the present invention, will become more apparent from the subsequent detailed description of the preferred embodiments when taken in conjunction with the accompanying drawings, wherein:

FIG. 3 is an enlarged cross-sectional view further illustrating the trunnion shown in FIG. 2, at a different angular orientation of the trunnion; and FIG. 4 is a cross-sectional view illustrating the axle assembly according to an alternative embodiment of the present invention.

DETAILED DESCRIPTION

Figure 1:
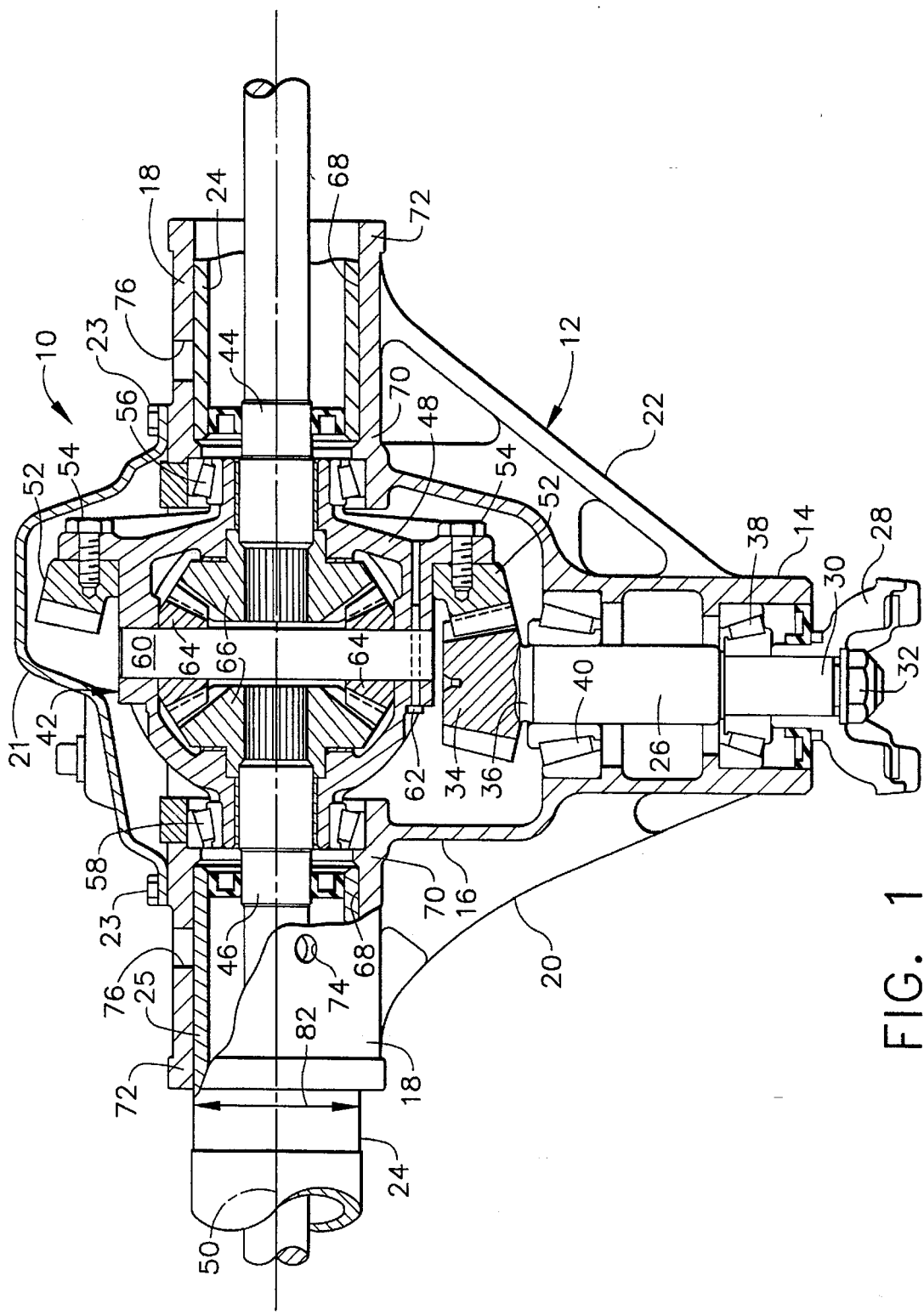
FIG. 1 is a cross-sectional view illustrating an axle assembly according to a preferred embodiment of the present invention.

Referring now to the drawings, wherein like reference numerals have been used for similar elements throughout, FIG. 1 is a cross-sectional view illustrating an axle assembly 10 which incorporates a support structure comprising an axle carrier 12 according to the present invention. Axle assembly 10 comprises a beam axle assembly, where the axle assembly 10 supports the suspension loads of the associated vehicle. The axle assembly 10 may comprise a forward axle assembly which is subjected to significant impact loads, but axle assembly 10 may also be advantageously utilized as a rear axle assembly. Axle carrier 12 includes a shaft receiving portion 14, a central, differential-receiving portion 16 attached to shaft receiving portion 14, and a pair of generally cylindrical, hollow trunnions 18 protruding from opposite sides of the differential-receiving portion 16. Axle carrier 12 preferably comprises a one-piece construction and preferably is made of a cast aluminum alloy. Alternatively, carrier 12 may be made of a cast magnesium alloy, or may be cast from other suitable lightweight alloys. Additionally, carrier 12 may alternatively comprise a two-piece construction and may be manufactured by methods other than casting. The specific construction of each trunnion 18 comprises a central feature of the present invention. Axle carrier 12 may optionally include strengthening ribs 20 and 22. Axle assembly 10 further includes a cover 21 which is fastened to carrier 12 with bolts 23 and a pair of generally cylindrical, hollow axle tubes 24, with each of the tubes 24 being inserted into one of the trunnions 18. Axle carrier 12 combines with each of the axle tubes 24 to form a pair of carrier-type axle housings.

Axle assembly 10 includes a pinion shaft 26 carrying a yoke 28 at a first end 30 of shaft 26. Yoke 28 is secured to end 30 of shaft 26 via nut 32 and is effective for receiving torque from a driving member (not shown) of the motor vehicle. A pinion gear 34 is rigidly affixed to a second, opposite end 36 of shaft 26. Pinion shaft 26 is rotatably supported within the shaft-receiving portion 14 of axle carrier 12 via bearing assemblies 38 and 40, respectively. Axle assembly 10 further includes a differential assembly, indicated generally at 42, which is effective for transferring torque from pinion shaft 26 to first and second output shafts, 44 and 46, respectively, of axle assembly 10. Torque is transferred to output shafts 44 and 46 via differential assembly 42 in a conventional manner so as to permit differential rotation between shafts 44 and 46. Differential assembly 42 includes a case 48 which is rotatable about a longitudinal centerline axis 50 of differential assembly 42. The centerline axis 50 of assembly 42 is coincident with the longitudinal centerline of output shafts 44 and 46. An annular face gear 52 is fastened to case 48 by conventional means such as bolts 54. Torque is transferred from pinion shaft 26 to case 48, which is rotatably supported within axle carrier 12 via bearing assemblies 56 and 58, respectively, via the meshing engagement of drive pinion gear 34 and the annular face gear 52. The differential assembly 42 further includes a cross pin shaft 60 having opposing ends disposed in bores formed in the rotatable case 48. Shaft 60 is retained in case 48 by locking pin 62. The differential assembly 42 further includes a pair of pinion gears 64 rotatably mounted on the shaft 60 and longitudinally spaced apart. Additionally, assembly 42 includes a pair of side gears 66, which preferably comprise bevel gears, with each of the bevel side gears 66 rigidly affixed to one of the output shafts 44 and 46 for rotation therewith. Accordingly, rotation of case 48 about centerline axis 50 results in rotation of output shafts 44 and 46. The interrelationship among pinion gears 64, side gears 66 and output shafts 44 and 46 permits differential, or relative rotation to exist between output shafts 44 and 46, which is required during certain operating conditions such as vehicle cornering. Output shafts 44 and 46 are rotatable within the corresponding ones of axle tubes 24.

Figure 2:
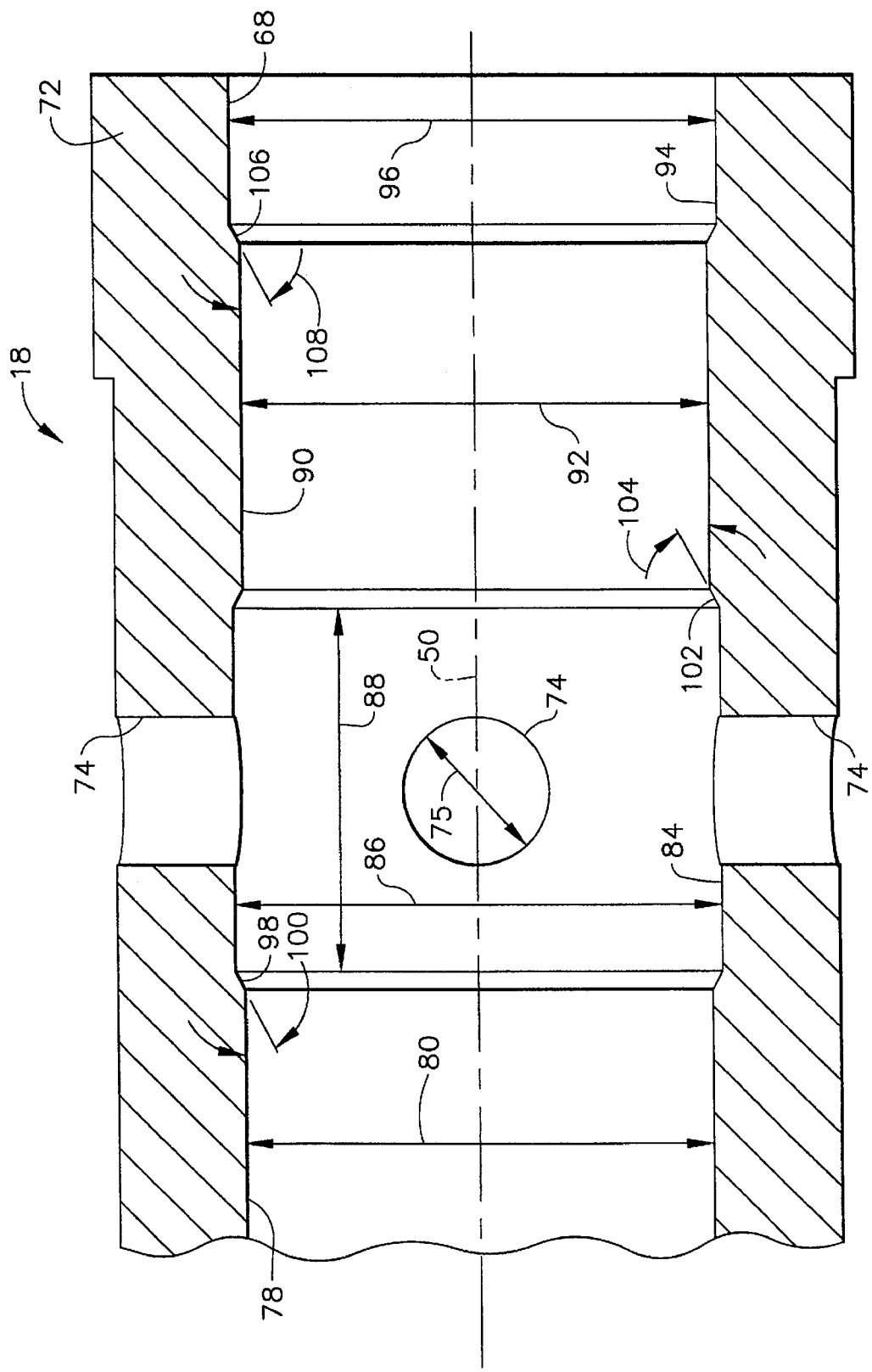
FIG. 2 is an enlarged cross-sectional view further illustrating one of the trunnions of the axle carrier illustrated in FIG. 1.

Referring now to FIGS. 1–3, the particular construction of each trunnion 18 as well as the relationship between trunnions 18 and axle tubes 24 is discussed in greater detail. Each trunnion 18 includes a radially stepped bore 68 formed therein which extends longitudinally between an inboard end 70 of trunnion 18 and an outboard end 72 of trunnion 18. As shown in FIG. 1, each axle tube 24 is inserted into the radially stepped bore 68 formed in the corresponding one of trunnions 18. Each trunnion 18 further includes at least one radially extending access hole 74 therethrough, and preferably includes a plurality of holes 74. In the illustrated embodiment, each trunnion 18 includes four equally spaced holes 74 which are effective for receiving weld material and puddle or plug welding trunnion 18 to the corresponding axle tube 24. As shown in FIG. 2, the plug-weld holes 74 are radially aligned with one another and each includes a diameter 75. Additionally, each trunnion 18 includes a spreader hole 76 which is preferably radially aligned with the plug-weld holes 74 and disposed circumferentially between a pair of the holes 74. The spreader hole 76 may be used to install tooling required to spread carrier 12 slightly during installation of the differential assembly 42 so as to achieve the desired preload on bearing assemblies 56 and 58 which rotatably support the differential assembly 42 within carrier 12. As shown in FIG. 3, spreader hole 76 includes a diameter 77 which is larger than the diameter 75 of each plug-weld hole.

FIG. 4 illustrates a portion of an axle carrier 12', included in axle assembly 10', according to an alternative embodiment of the present invention. Carrier 12' includes a pair of axially spaced trunnions 18' (only one shown) which each include a plurality of circumferentially spaced plug-weld holes (only one shown) and a spreader hole 76' which is axially spaced from the plug-weld holes 74'. Carrier 12' may otherwise be the same as carrier 12. It is noted that in either trunnion 18 or trunnion 18' the number of plug-weld holes, the relative sizes between the plug-weld and spreader holes, and the axial relationship between the plug-weld and spreader holes are not central features of the present invention. Rather, what is important is the axial relationship between holes 74 and 76 and the various features of stepped bore 68, as subsequently discussed.

The radially stepped bore 68 formed in each trunnion 18 includes a first axially, or longitudinally, extending and generally cylindrical portion 78 having a diameter 80. Portion 78 of bore 68 extends from the inboard end 70 of trunnion 18 toward the outboard end 72 of trunnion 18. Each axle tube 24 is generally cylindrical and the portion 25 of each tube 24 which is inserted into the corresponding trunnion 18, and which may protrude outboard of the trunnion as shown in FIG. 1, has an outside diameter 82 which is slightly larger than the diameter 80 of the first axially extending portion 78 of the stepped bore 68. Accordingly, each tube 24 engages the portion 78 of the corresponding trunnion 18 in a diametral interference fit. The radially stepped bore 68 further includes a second axially extending, generally cylindrical portion 84 having a diameter 86 which is slightly larger than the diameter 80 of portion 78 of bore 68 and slightly larger than the outside diameter 82 of axle tube 24. The difference between diameter 86 and the outside diameter 82 of tube 24 is somewhat less since diameter 82 is slightly larger than diameter 80 of the first portion 78 of stepped bore 68. However, diameter 86 of the second portion 84 of bore 68 is sized such that an annular clearance always exists between tube 24 and trunnion 18 throughout the second portion 84 of stepped bore 68. Each puddle, or plug weld hole 74 extends radially through the wall thickness of trunnion 18 and intersects the second portion 84 of stepped bore 68 as shown in FIG. 2. Portion 84 includes an axial width 88 which is sized so that holes 74 do not extend axially beyond portion 84. Accordingly, the stress concentration due to the geometry of holes 74 is not exacerbated, or compounded, by an interference fit between trunnion 18 and axle tube 24 in the area of holes 74. Accordingly, the relatively loose fit between axle tube 24 and trunnion 18 in the area of holes 74 enhances the load carrying capacity of trunnion 18. Stepped bore 68 further includes a third axially extending, generally cylindrical portion 90 which is positioned outboard of the second portion 84 of stepped bore 68 and has a diameter 92 which is less than the outside diameter 82 of axle tube 24. Accordingly, axle tube 24 engages trunnion 18 in a diametral interference fit throughout the axial extent of portion 90 of stepped bore 68. In a preferred embodiment, the diameter 92 of portion 90 is substantially equal to the diameter 80 of portion 78 of stepped bore 68. The stepped bore 68 further includes a fourth axially extending, generally cylindrical portion 94 having a diameter 96 which is greater than the outside diameter 82 of axle tube 24 so that an annular clearance exists between tube 24 and trunnions 18 throughout the axial extent of portion 94. Portion 94 is positioned outboard of the third portion 90 of stepped bore 68 and extends through the outboard end 72 of trunnion 18. Fractures have been known to initiate at the outboard end of the trunnions of prior aluminum axle carriers due to overload conditions. Accordingly, the annular clearance between tube 24 and trunnion 18 at the outboard end 72 of trunnion 18, created by portion 94 of stepped bore 68, further enhances the load carrying capacity of trunnion 18. The diameter 96 of portion 94 is preferably substantially equal to the diameter 86 of the second portion 84 of stepped bore 68. Trunnion 18 further includes three annular shoulders transitioning between the various adjacent portions of stepped bore 68. A first annular, outboard-facing shoulder 98 transitions between the first and second portions 78 and 84, respectively, of stepped bore 68 and is formed at an acute angle 100 with respect to the cylindrical portion 78. A second annular, inboard-facing shoulder 102 transitions between the second and third portions, 84 and 90, respectively, of stepped bore 68 and is formed at an angle 104 relative to portion 90. A third annular, outboard-facing shoulder 106 transitions between the third and fourth portions 90 and 94, respectively, of stepped bore 68 and is formed at an angle 108 relative to portion 90. Preferably, angles 100, 104 and 108 are substantially equal to one another and are typically equal to approximately 30°, but other transition angles are contemplated in the invention.

In operation, the use of the radially stepped bore 68 in each of the trunnions 18 provides stress relief in the areas of each trunnion 18 corresponding to the plug weld holes 74 and spreader hole 76, as well as at the outboard end 72 of trunnion 18, by eliminating the interference fit between each trunnion 18 and the corresponding axle tube 24 in these areas. Accordingly, the use of radially stepped bore 68 in each trunnion 18 enhances the structural integrity of trunnion 18, while maintaining the required assembly rigidity by providing an interference fit between tube 24 and trunnion 18 throughout portions 78 and 90 of the stepped bore 68.

While the foregoing description has set forth the preferred embodiments in particular detail, it must be understood that numerous modifications, substitutions and changes can be undertaken without departing from the true spirit and scope of the present invention as defined by the ensuing claims. For instance, the radially stepped trunnion bore may be included in trunnions incorporated in support structures other than those shown in the illustrated embodiments. The invention is therefore not limited to specific preferred embodiments as described, but is only limited as defined by the following claims.

What is claimed is:

1. An axle assembly comprising:

an axle carder having a pair of axially spaced trunnions;

first and second generally cylindrical axle tubes each inserted into one of said trunnions;

wherein each of said trunnions includes a radially stepped bore formed therein, an inboard end, and an outboard end, said radially stepped bore extending between said inboard end and said outboard end;

wherein each of said radially stepped bores includes a first axially extending, generally cylindrical portion having a diameter, said first portions extending from said inboard end of said trunnion toward said outboard end and wherein the corresponding one of said axle tubes has an outside diameter which is greater than said diameter of said first portion of said radially stepped bore so that said corresponding one of said axle tubes engages said trunnion in an interference fit throughout said first portion of said radially stepped bore;

wherein each of said radially stepped bores further includes a second axially extending, generally cylindrical portion having a diameter which is greater than said outside diameter of said corresponding one of said axle tubes such that an annular clearance is formed between said corresponding one of said axle tubes and said second portion of said trunnion, said second portion being positioned outboard of said first portion;

wherein each of said trunnions further includes at least one radially extending hole formed therethrough and intersecting the corresponding one of said second portions of said radially stepped bores.

2. The axle assembly as recited in claim 1, wherein, each said radially stepped bore further includes a third axially extending, generally cylindrical portion having a diameter which is less than the outside diameter of the tube so that the tube engages said trunnion in an interference fit throughout said third portion of said radially stepped bore; and said third portion of said radially stepped bore is positioned outboard of said second portion of said radially stepped bore.

3. The axle assembly as recited in claim 2, wherein, each said radially stepped bore further includes a fourth axially extending, generally cylindrical portion having a diameter which is greater than the outside diameter of said axle tube;

said fourth portion is positioned outboard of said third portion and extends through said outboard end of said trunnion.

4. The axle assembly as recited in claim 2, wherein, said diameter of said third portion of said radially stepped bore is substantially equal to said diameter of said first portion of said stepped bore.

5. The axle assembly as recited in claim 3, wherein, said diameter of said fourth portion of said radially stepped bore is substantially equal to said diameter of said second portion of said radially stepped bore.

6. The axle assembly as recited in claim 1, wherein, each said trunnion further includes a second radially extending hole formed therethrough, said second hole being axially spaced apart from said at least one radially extending hole and intersecting said second portion of said radially stepped bore.

7. The axle assembly as recited in claim 1, wherein, each said at least one radially extending hole comprises a plurality of circumferentially spaced and radially extending plug-weld holes formed through said trunnion.

8. The axle assembly as recited in claim 7, wherein, each said trunnion further includes a spreader hole having a diameter which is larger than a diameter of each of said plug-weld holes.

9. The axle assembly as recited in claim 8, wherein, each said spreader hole is aligned with said circumferentially spaced plug-weld holes.

10. The axle assembly as recited in claim 8, wherein, each said spreader hole is axially spaced from said plug-weld holes.

11. The axle assembly as recited in claim 1, wherein, said axle carrier comprises a one-piece construction and is made of a cast aluminum alloy.

* * * * *